United States Patent [19]

Crawford

[11] Patent Number: 4,636,952
[45] Date of Patent: Jan. 13, 1987

[54] METHOD AND APPARATUS FOR BACK PROJECTION IMAGE RECONSTRUCTION USING VIRTUAL EQUI-SPACED DETECTOR ARRAY

[75] Inventor: Carl R. Crawford, Milwaukee, Wis.

[73] Assignee: General Electric Company, Milwaukee, Wis.

[21] Appl. No.: 677,560

[22] Filed: Dec. 3, 1984

[51] Int. Cl.⁴ .............................................. G06F 15/42
[52] U.S. Cl. ................................... 364/414; 378/901; 378/4
[58] Field of Search ............... 364/414; 378/901, 4.11, 378/14, 19

[56] References Cited

U.S. PATENT DOCUMENTS 4,222,104  9/1980  Moore .................................. 364/414
4,460,961  7/1984  Opdeback .......................... 364/414

Primary Examiner—Jerry Smith
Assistant Examiner—Kimthanh Bui
Attorney, Agent, or Firm—Flehr, Hohbach, Test, Albritton & Herbert

[57] ABSTRACT

Image reconstruction in a tomographic scanning system using a fan beam of radiation and a curved equi-angular detector array is facilitated by mapping signals from the curved array into a virtual equi-spaced planar detector array. Back projection image reconstruction algorithms are simplified by using the signals from the virtual equi-spaced planar array.

12 Claims, 4 Drawing Figures

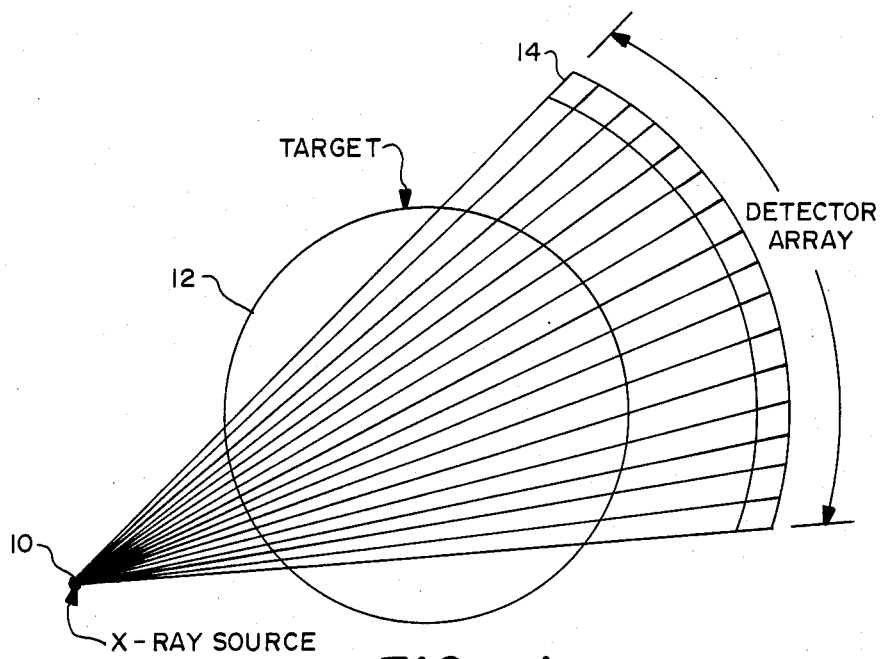
FIG.—1
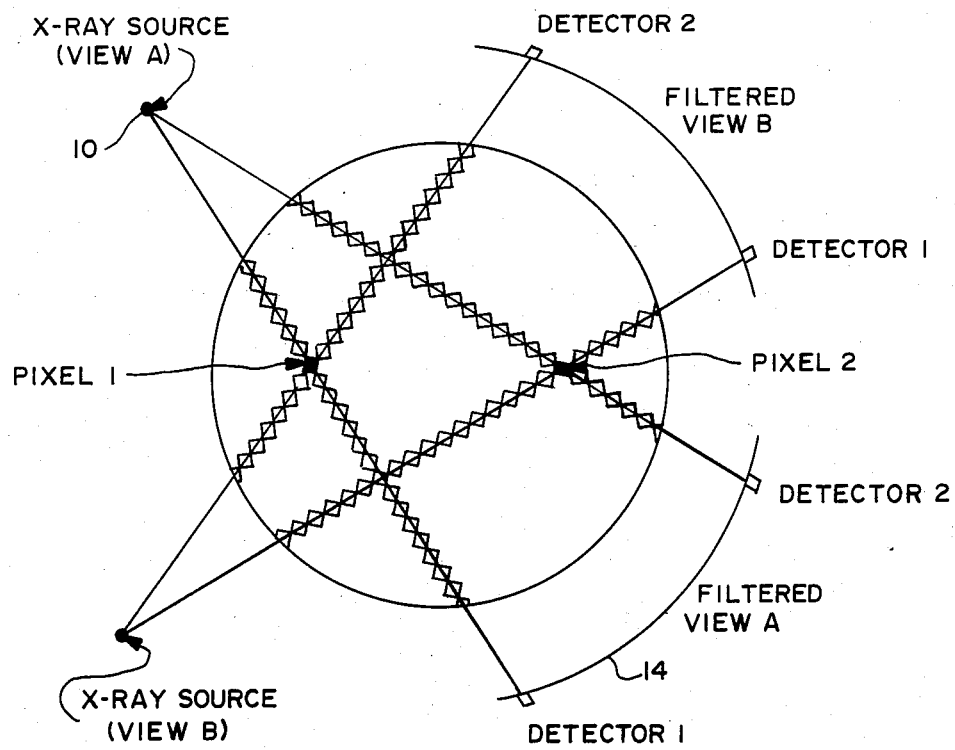
FIG.—2

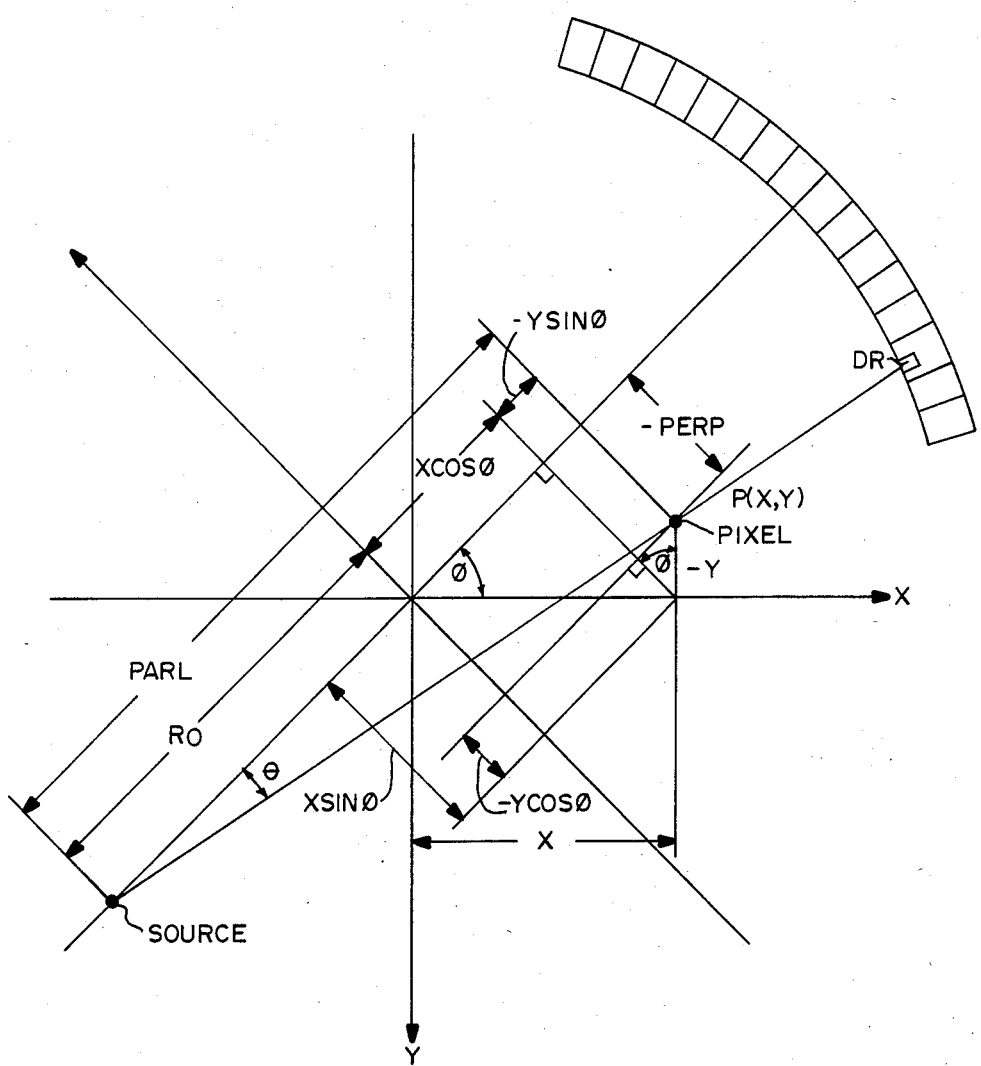
FIG.—3

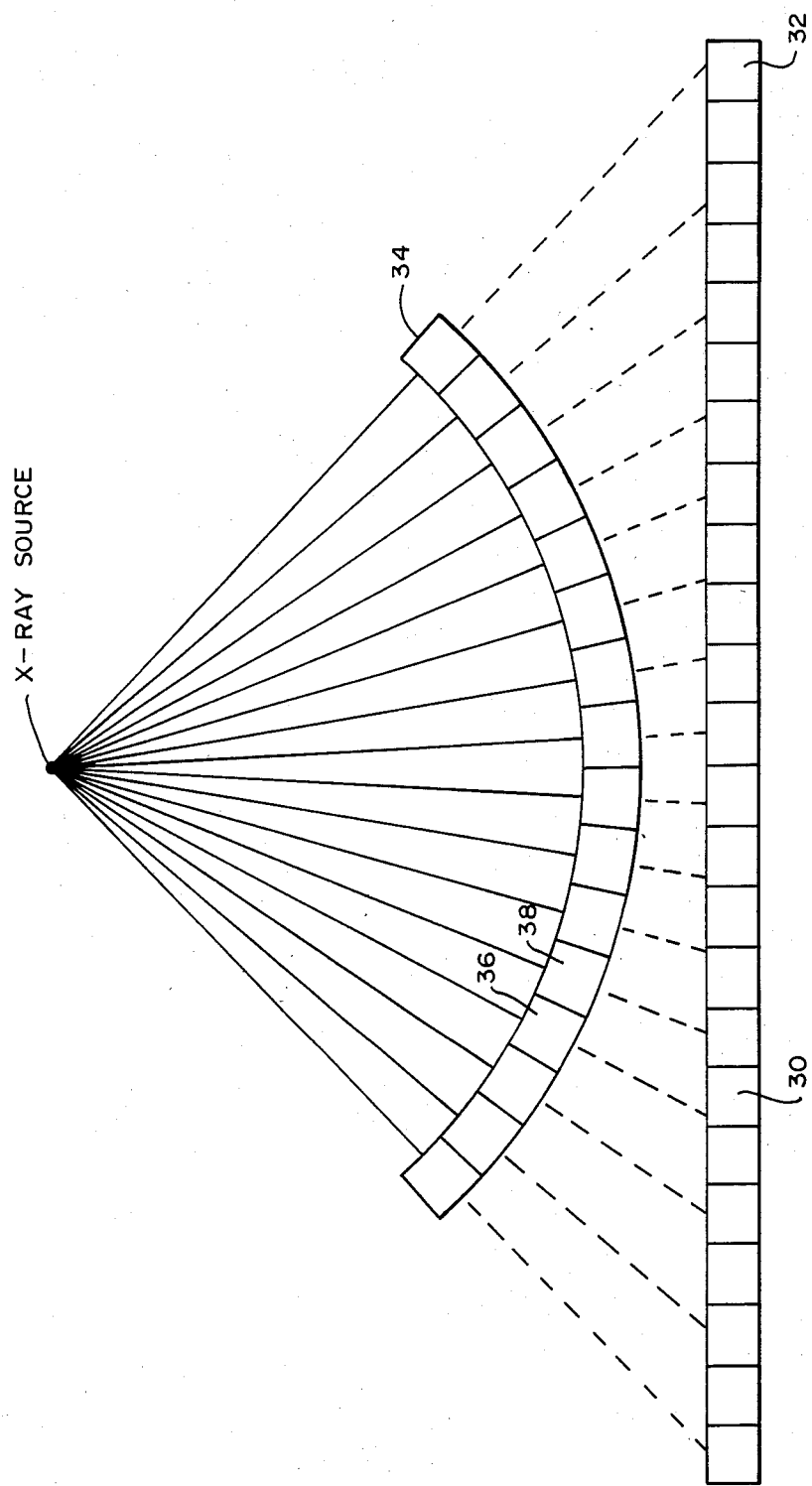

METHOD AND APPARATUS FOR BACK PROJECTION IMAGE RECONSTRUCTION USING VIRTUAL EQUI-SPACED DETECTOR ARRAY

This invention relates generally to back projection image reconstruction such as used in computed tomography, and more particularly the invention relates to an improvement in image reconstruction through use of a virtual equi-spaced detector array.

In computed tomography (CT) scanning systems, an X-ray fan beam is projected along a plane through a patient to a plurality of radiation detectors which provide measurements of X-ray attenuation through the patient along radial lines defined by the X-ray source and the individual detectors. Measurements are made at a plurality of source positions or views around the patient to obtain sets of measurements representing sets of intersecting radiation beam paths. An image of the plane through the patient is obtained by back projecting filtered X-ray measurements from each detector along the radial lines of the X-ray transmission in accordance with a well known image reconstruction formula for either equi-angular or equi-spaced fan beam projections. See Rosenfeld and Kak, *Digital Picture Processing*, Academic Press 1982, and in particular Chapter 8.6, Reconstruction from Fan Beams pp. 397–415. The back projection algorithms require the location of a detector in each filtered projection for each pixel in the field of view. The image reconstruction formula adjusts or weights the back projection detector measurements for each pixel as a function of the distance of the pixel from the source of radiation. Thus, the image picture elements or pixels within the image plane are defined by the cumulative back projection of detector measurements through the pixels.

For equi-angular fan beam projections the detector array is arranged along an arc whereby the angle relative to the source which is subtended by adjacent pairs of detector cells is constant across the array. For equi-spaced fan beam projections, the detector array is linearly arranged in a plane; in essence the curved array is flattened so that the detectors lie on a straight line tangent to the original curve or arc. The curved array is preferably due to radiation collimation and aperture uniformity design considerations.

The fan beam reconstruction algorithms are nearly identical for equi-angular and for equi-spaced fan beam projections. However, the equi-spaced algorithm is simpler to calculate because of two basic differences.

Consider a pixel in an image space rotated to match the angular position of the source. The source-line is defined as the line connecting the source with the center of rotation. PERP is the perpendicular distance from the pixel to the source-line, and PARL is the distance measured parallel to the source-line from the source to the pixel.

In the equi-angular fan beam projection reconstruction algorithm, the coordinate of the filtered projection value to be back projected to the image reconstruction matrix is given by arctan (PERP/PARL). In the equi-space case, however, the coordinate is calculated from just PERP/PARL. Thus, the use of the equi-space algorithm obviates the need for one arctan operation per pixel and per projection.

The second difference between the algorithm lies in the calculation of the pixel-weight function. Before the filter projection value is added to the image reconstruction matrix, it is divided by the square of the pixel-weight function, L, which in the equi-angular case is given by:

$$L^2 = PERP^2 + PARL^2.$$

However, the weight in the equi-space case, U, is given by:

$$U^2 = PARL^2.$$

Thus, one squaring operation and one addition per pixel and per view are obviated if the equi-space algorithm is used instead of the equi-angle algorithm.

An object of the present invention is improved method and apparatus for back projection image reconstruction.

Another object of the invention is back projection apparatus which employs an equi-angular curved detector array but which allows use of a planar equi-space detector algorithm for back projection.

A feature of the invention is the use of interpolation for converting unfiltered radiation attenuation data from an equi-angular detector to a virtual equi-spaced detector array.

Briefly, back projection image reconstruction apparatus in accordance with the invention employs a curved equi-angular detector array for detecting radiation passing through a target area from a source. The radiation measurements from the curve detector are mapped to equivalent radiation measurements using a flat or virtual equi-spaced detector array. The mapping is accomplished by interpolation preferably using a linear interpolation or Lagrange interpolation. The mapped data is then used for back projection reconstruction of an image using the algorithm for equi-spaced detectors.

The invention and objects and features thereof will be more readily apparent from the following detailed description and appended claims when taken with the drawing, in which:

FIG. 1 is a schematic illustrating the geometry of a CT system.

FIG. 2 is a schematic illustrating the back projection of detector data for reconstructing an image of multiple x-ray transmission elements using a curved or equiangular detector array.

FIG. 3 is a schematic illustrating the coordinate system used in General Electric scanning systems including the pixel coodinate system and the detector coordinate system for a curved array.

FIG. 4 is a schematic illustrating the mapping of radiation attenuation data from a curved equi-angular array into a gradual equi-spaced detector array.

Referring now to the drawings, FIG. 1 is a schematic illustrating the geometry of a CT scanning system for an X-ray fan beam radiation. The X-ray source 10 is located on one side of a target area 12, and an array of detector elements 14 are positioned on the opposite side of the target area 12. As illustrated, the detectors of array 14 are equi-angularly spaced with respect to the source 10. A number of sets of radiation measurements or views are obtained by rotating the X-ray source and detector array around the target. The process of converting the collected X-ray attenuation data from axial scans (i.e. view data) to viewable cross-sectional images involves a data reconstruction process. The three stages of reconstruction include preprocessing of the detector data, filtration of the preprocessed data, and backprojection of the data to obtain pixel values.

Back projection is a technique used to reconstruct an image from multiple X-ray transmission measurements. Referring to FIG. 2, the X-ray beam from source 10 passes through many small regions in the plane of the target area through which the views are taken before reaching the array of detectors 14. Each of the small regions through which the radiation passes are the picture elements or pixels which comprise the final displayed image. The X-ray absorption value for a pixel is calculated based on the location of the pixel with respect to the source and the coresponding detector value. The back projection algorithm performs calculations on a number of sets of filtered view data to produce an image in which each pixel is a composite of all the views. In FIG. 2, the value of pixel 1 will include a weighted value of detector 1 in filtered view A and a weighted value of detector 2 in filtered view B. Similarly, the value of pixel 2 will include a weighted value of detector 2 in filtered view A and a weighted value of detector 1 in view B. In order to back project a complete image, absorption data from all views of a given axial scan must be summed into each pixel.

In the G. E. CT scanning system, a coordinate system as illustrated in FIG. 3, called PERP and PARL, is used to perform coordinate transformation. PARL is the distance from the source to a pixel parallel to the line connecting the source to the center of the detector array, and PERP is the perpendicular distance of the pixel from the line connecting the source and the center of the array. PARL and PERP values for a pixel can be calculated from the geometry as follows:

$$PARL = R_0 + X \cos(\phi) - Y \sin(\phi)$$

$$PERP = X \sin(\phi) - Y \cos(\phi)$$

where $\phi$ is the angle between the x-axis of the (X, Y) coordinate system and 'x-ray source to center detector' vector. R0 is the distance between the x-ray source and the origin of the (X,Y) system. The angle $\phi$ varies for each view processed. This assumes that X and Y directions are as shown in the figure.

In the equi-angular fan beam projection reconstruction algorithm, the coordinate of the filtered projection value to be back projected to the image reconstruction matrix is given by arctan (PERP/PARL). In the equispace case, however, the coordinate is calculated from just PERP/PARL. Thus, the use of the equi-space algorithm obviates the need for one arctan operation per pixel and per projection.

Additionally, before the filter projection value is added to the image reconstruction matrix, it is divided by the square of the pixel-weight function, L, which in the equi-angular case is given by:

$$L^2 = PERP^2 + PARL^2.$$

However, the weight in the equi-space case, U, is given by:

$$U^2 = PARL^2.$$

Thus, one squaring operation and one addition per pixel and per view are obviated if the equi-space algorithm is used instead of the equi-angle algorithm. The equiangular calculations are time consuming in a software implementation and require additional pipeline of circuitry in a hardware implementation.

Use a planar equi-spaced detector array is complicated by the design requirements of radiation collimator and detector aperture uniformity. However, in accordance with the present invention data obtained from using the curved equi-angular detector array is mapped into a virtual planar equi-spaced detector as illustrated in FIG. 4. A weighting technique for prefiltered data is disclosed in U.S. Pat. No. 4,275,444 which is similar in objective. In the present invention, for example, a detector element 30 of the planar equi-spaced array 32 is obtained by mapping detected values from the curved equi-spaced detector array 34. In this instance a linear interpolation can be employed wherein the mapped value for the virtual detector 30 is a linear interpolation of the unfiltered values of detector 36 and detector 38 in array 34. For example, the value 30 may be given as $$V_{30} = 80\% \ V_{36} + V_{38}$$

The above equation is an example of a linear interpolation of the value of the virtual detector 30. Other interpolation techniques such a Lagrange interpolation, can be employed. The interpolation is readily implemented by programmed computer means or by hardware.

By defining unfiltered data for a virtual equi-spaced planar detector array based on unfiltered data actually obtained from an equi-angular curved detector array, the construction of an image by back projection is facilitated which is less time consuming in software implementation and less costly in hardware implementation. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a tomographic system using a fan beam radiation source and a curved equi-angular detector array for detecting attenuated radiation, an improved method of image reconstruction comprising the steps of mapping unfiltered signals of attenuated radiation from said curved equi-angular detector array into signals for a virtual equi-spaced planar detector array, filtering said signals for a virtual equi-spaced planar detector, and reconstructing an image based on said filtered signals for said virtual array.

2. The method as defined by claim 1 wherein said step of mapping signals comprises interpolating a plurality of signals from said curved equi-angular detector array for deriving each signal for said virtual array.

3. The method as defined by claim 2 wherein said interpolating comprises linear interpolating.

4. The method as defined in claim 2 wherein said interpolating comprises Lagrange interpolation.

5. In a tomographic system using a fan beam radiation source and curved equi-angular detector array for detecting attenuated radiation, a method of modifying unfiltered signals from said curved equi-angular detector array before image reconstruction comprising the steps of defining a virtual equi-spaced planar detector array, and mapping said signals from said curved equi-angular detector array into signals for said virtual equi-spaced planar detector array.

6. The method as defined by claim 5 wherein said step of mapping signals comprises interpolating a plurality of signals from said curved equi-angular detector array for deriving each signal for said virtual array.

7. The method as defined by claim 6 wherein said interpolating comprises linear interpolation.

8. The method as defined by claim 6 wherein said interpolating comprises Lagrange interpolations.

9. In a tomographic system using a fan beam radiation source, means for generating signals for use in image reconstruction by backprojection comprising a curved equi-angular detector array for detecting radiation with each detector of said curved array generating an electrical signal in response to detected radiation, and means for mapping said signals from said curved array into signals for a virtual equi-spaced planar detector array for use in back projections.

10. Means for generating signals as defined by claim 9 wherein said means for mapping interpolates values of a plurality of signals from said curved array in mapping a signal for said virtual planar array.

11. Means for generating signals as defined by claim 10 wherein said means for mapping linearly interpolates values of a plurality of signals from said curved array in mapping a signal for said virtual planar array.

12. Means for generating signals as defined by claim 11 wherein said means for mapping interpolates by Lagrange interpolation.

* * * * *